United States Patent [19]

Nagy et al.

[11] Patent Number: 5,622,999
[45] Date of Patent: Apr. 22, 1997

[54] POLYSILICIC ACID/POLYISOCYANATE BASIC MATERIALS, BINDING MATERIALS AND FOAMS AND PROCESS FOR PREPARING SAME

[75] Inventors: Gabor Nagy; Miklos Barothy; Margit Menyhart, all of Budapest, Hungary

[73] Assignee: Polinvent Fejleszto, Kivitelezo es Ertekesito KFT, Budapest, Hungary

[21] Appl. No.: 185,924

[22] PCT Filed: May 18, 1992

[86] PCT No.: PCT/HU92/00022

§ 371 Date: Jan. 19, 1994

§ 102(e) Date: Jan. 19, 1994

[87] PCT Pub. No.: WO92/21713

PCT Pub. Date: Dec. 10, 1992

[30] Foreign Application Priority Data

Jun. 3, 1991 [HU] Hungary ............................. 1843/1991

[51] Int. Cl.$^6$ ..................................... C08G 18/18
[52] U.S. Cl. .......................... 521/106; 521/107; 521/108; 521/122; 521/128; 521/129; 521/130; 521/906; 521/707; 521/710; 521/712; 528/51
[58] Field of Search ................................. 521/106, 107, 521/108, 122, 128, 129, 130, 906; 524/707, 710, 712; 252/182.2; 528/51

[56] References Cited

U.S. PATENT DOCUMENTS 4,136,238  1/1979  Hilterhaus et al. ..................... 521/107

FOREIGN PATENT DOCUMENTS

HUT54183  1/1991  Hungary .
208330  5/1993  Hungary .
207746  3/1994  Hungary .

Primary Examiner—Rachel Gorr
Attorney, Agent, or Firm—Herbert Dubno; Jonathan Myers

[57] ABSTRACT

The invention relates to novel polysilicic acid/polyisocyanate basic materials, binding materials and foams with improved mechanical properties as well as a higher resistance against heat and chemicals. It is characteristic of the new base materials that they are built up (composed) of

- 100 parts by mass of a polyisocyanate,
- 50–400 parts by mass of a polysilicic acid component,
- 0.5–70 parts by mass of phosphoric acid triesters and/or salts of phosphoric acid mono- and/or diesters formed with amines and/or alkaline metals,
  and optionally
- 0–5 parts by mass of a catalysts containing a tertiary amino group,
- 0–50 parts by mass of a reactive diluent,
- 0–10 parts by mass of tenside(s)

as well as 0–400% by mass of fillers and optionally other auxiliaries, calculated for the total mass (=100%) of the components listed above.

14 Claims, No Drawings

5,622,999

POLYSILICIC ACID/POLYISOCYANATE BASIC MATERIALS, BINDING MATERIALS AND FOAMS AND PROCESS FOR PREPARING SAME

The present application was filed under the provisions of 35USC3716, as the U.S. National phase of PCT application PCT/HU92/00022 filed May 18, 1992.

FIELD OF THE INVENTION

This invention relates to novel polysilicic acid/polyisocyanate basic materials, binding materials and foams with improved mechanical properties as well as high resistance against heat and chamicals. The invention further relates to a process for the preparation thereof, in the course of which the usual di- and/or polyisocyanates and liquid, water-containing and/or anhydrous polysilicic acid derivatives and optionally reactive diluents are used, and the gelation time can be, according to the invention, controlled between broad limits.

BACKGROUND OF THE INVENTION

Organic/inorganic polymers prepared from polyisocyanates and polysilicic acids (hereinafter abbreviated: PP resins) have been known for about the last two decades. Their discovery and further development are first of all associated with the name of Dieter Dieterich as shown inter alia by the Hungarian patent specifications Nos. 168,586; 169,478; 176,469 and by chapter No. 2.4.9 regarding polyurethanes (by G. W. Becker and D. Braun) in the monograph "Kunststoff-Handbuch 7" (publisher: Editor K. Hansen, München, 1983). Meanwhile industrial products based on these basic materials appeared on the market (e.g. the products "Wilkit" and "Wisitom" of the Willich Company, Germany).

In comparison with the traditional molded polyurethane resins or foams, respectively, these inorganic/organic complymars possess a number of advantageous properties. Thus, e.g. their resistance to fire is significantly better (they are self-extinguishing), their solidity is less rapidly decreased at higher temperatures (>100° C.) and they are much cheaper. A disadvantage is that, products made of these materials and possessing good mechanical properties can be obtained only by rapidly accelerating the reaction with catalysts, which results in a gelation time of 2 to 3 minutes which is too rapid in many cases. However, the mechanical properties (bending strength, tensile strength and the like) of the traditional polyester resins cannot be achieved even in this case.

Bayer AG of Germany did pioneering work in the area of polysilicic acid/polyurethanes aimed at the utilization of MDI adducts sulfonated or made otherwise hydrophilic (German patent publications Nos. DE-AS 2,359,606; 2,359,612; foams: German patent publication No. DE-AS 2,450,834; concrete: Hungarian patent specification No. 168,586; preparation of sulfonated MDI adducts: German patent publications Nos. DE-OS 2,651,065 and 2,916,135). However, these modified polyisocyanates are substantially more expensive than the crude MDI [4,4-methylenedi(phenylisocyanate)] of technical grade.

According to our unpublished invention disclosed in the Hungarian patent application No. 2519/90, the features of PP resins can significantly be improved by adding aliphatic and/or cycloaliphatic and/or aromatic epoxy resins to the isocyanate component. However, this method also involves the drawback that the reaction proceeds too rapidly and the gelation occurs within 2 to 10 minutes. During this short period, inorganic and organic fillers, strengthening structural elements can be incorporated only to a limited extent. On the other hand, epoxy resins, particularly the less viscous aliphatic and cycloaliphatic epoxy resins, are very expensive: their price highly exceeds that of the crude MDI and other di- or polyisocyanates produced on an industrial scale.

In the Hungarian patent applications No. 2381/89 (published under No. T/54,182) and No. 2382/89 (published under No. T/54,183) the addition of so-called reactive diluents is suggested. These are built into the polymer during the hardening thereof; they are usually substantially cheaper than the isocyanate or epoxy component and, in addition, they improve the emulsifiability of the polyisocyanate in the water-glass. By using these ester-type reactive diluents, it is successfully possible to prepare products of high quality from crude MDI and thus, the preparation of expensive adducts sulfonated or made otherwise hydrophilic can be avoided. The process according to the Hungarian patent applications cited above, however, has the same drawback as those mentioned above: the time of gelation can be controlled only within a very short interval.

OBJECT OF THE INVENTION

The object of the invention is to find novel polysilicic acid/polyisocyanates and a process for the preparation thereof, which can be obtained from unmodified, preferably cost-saving polyisocyanates, most possibly without using expensive additives, further which approach polyesters in their mechanical characteristics and have a gelation proceeding slowly enough to allow the incorporation of an up to 3-fold amount of fillers or strengthening materials.

SUMMARY OF THE INVENTION

According to the invention this task has been solved in such a way that as reactive fillers phosphoric acid triesters and/or the salts of phosphoric acid monoesters and/or diesters formed with amines and/or alkaline metals are used. It is recognized that in this case the use of the usual tertiary amines as catalysts can entirely be eliminated; the PP resins prepared in this way can show outstanding mechanical properties and a very good resistance against chemicals, without any amine catalyst. The reaction rate can be adjusted by the suitable selection of the amount and nature of the phosphoric acid esters. Thus, binding materials containing a high proportion of granular or fibrous fillers can be prepared from the novel resins. Thus, after the polyesters, vinyl esters and epoxy resins, PP resins became also suitable to prepare peculiar, highly stable binding materials, laminated and composite products according to the invention. In addition, these resins are usually substantially cheaper than the common plastics.

The polysilicic acid/polyisocyanate systems catalyzed by phosphoric acid esters in a new way (hereinafter: PPP resins) can be used in a versatile manner particularly for the reason that, in addition to the phosphoric acid ester catalysts, the commmon tertiary and ditertiary catalysts and other compounds containing a tertiary amino group can also be utilized. By the means of catalyst combinations of this kind, the gelation time can optionally be adjusted e.g. to a value between 10 seconds and 5 hours.

Thus, this invention relates to novel polysilicic acid/ polyisocyanate based materials, binding materials and foams. According to the invention, they comprise 100 parts by mass of a polyisocyanate,
50–400 parts by mass of a polysilicic acid component,
0.5–70 parts by mass of phosphoric acid triesters and/or salts of phosphoric acid mono- and/or diesters formed with amines and/or alkaline metals,
and optionally
0–5 parts by mass of a catalyst containing a tertiary amino group,
0–50 parts by mass of a reactive diluent,
0–10 parts by mass of tenside(s)

as well as 0–400% by mass of fillers and optionally other auxiliaries, calculated for the total mass (=100%) of the components listed above.

The new copolymers preferably comprise 100 parts by mass of a polyisocyanate,
80–200 parts by mass of a polysilicic acid component,
3–50 parts by mass of phosphoric acid triesters and/or salts of phosphoric acid mono- and/or diesters formed with amines and/or alkaline metals,
and optionally
0–1 part by mass of a catalyst containing a tertiary amino group,
5–30 parts by mass of a reactive diluent,
0–5 parts by mass of tenside(s)

as well as 50–200% by mass of fillers and optionally other auxiliaries, calculated for the total mass (=100%) of the components listed above.

The invention further relates to a process for the preparation of the above-mentioned basic materials, binding materials and foams, in the course of which the usual di- and/or polyisocyanates and liquid, water-containing and/or anhydrous polysilicic acid derivatives, and optionally active diluents are used. The process according to the invention is characterized in that 100 parts by mass of a polyisocyanate,
50–400 parts by mass of a polysilicic acid component,
0.5–70 parts by mass of phosphoric acid triesters and/or salts of phosphoric acid mono- and/or diesters formed with amines and/or alkaline metals,
and optionally
0–5 parts by mass of a catalyst containing a tertiary amino group,
0–50 parts by mass of a reactive diluent,
0–10 parts by mass of tenside(s)

are homogenized together, and optionally 0–400% by mass of fillers and other auxiliaries, calculated for the total mass (=100%) of the components listed above, are incorporated thereto.

The process is preferably carried out in such a way that 100 parts by mass of a polyisocyanate,
80–200 parts by mass of a polysilicic acid component,
3–50 parts by mass of phosphoric acid triesters and/or salts of phosphoric acid mono- and/or diesters formed with amines and/or alkaline metals,
and optionally
0–1 parts by mass of a catalyst containing a tertiary amino group,
5–30 parts by mass of a reactive diluent,
0–5 parts by mass of tenside(s)

are homogenized together, and optionally 50–200% by mass of fillers and other auxiliaries, calculated for the total mass (=100%) of the components listed above, are incorporated thereto.

According to the invention phosphoric acid esters of aliphatic or cycloaliphatic alcohols as well as phenols are preferably used as phosphoric acid esters. Examples of these esters are e.g.: trimethyl phosphate, triethyl phosphate, tributyl phosphate, tri(2-ethylhexyl) phosphate, diethylbutyl phosphate, triphenyl phosphate, tricresyl phosphate, diphenyl cresyl phosphate; trichloroethyl phosphate, trichloropropyl phosphate, tribromopropyl phosphate, tris(dichloropropyl) phosphate, tris(dibromopropyl) phosphate, diethyl chloroethyl phosphate, dicresyl chloropropyl phosphate, furthermore diphosphates, oligomeric phosphates or aliphatic esters of polyols containing phosphoric acid ester bonds with the following structures:

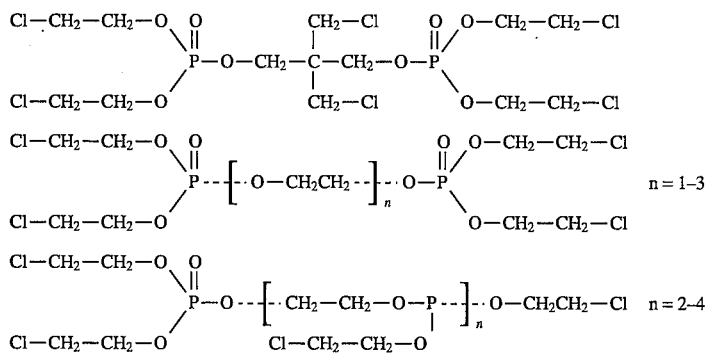

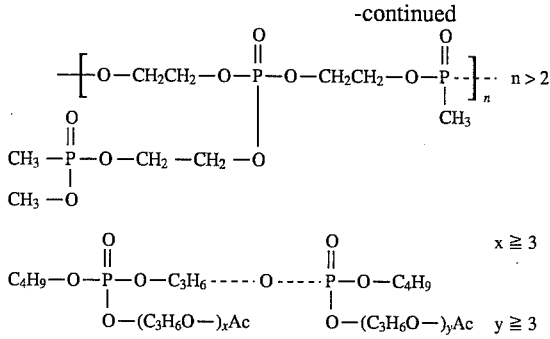

wherein AC means CH₃CO— or an other aliphatic acyl group or mixtures of at least two compounds listed above.

Due to their free acid groups, phosphoric acid mono- and diesters alone are unsuitable since, when being mixed to the polysilicic acid component, they immediately induce gelation, leading to an nonhomogeneous product with unfavorable mechanical features. The salts formed from the mono- and diesters with tertiary amines and/or alkaline metal compounds (hydroxides, carbonates and the like) are, on the one hand, compatible with the isocyanate compound, their mixtures can be stored without any deterioration of the quality and, on the other hand, they are active catalysts. The catalytic effect is significantly strengthened by the salt-forming tertiary amine, after it has been liberated under effect of the water-glass.

The following phosphoric acid mono- and diesters are e.g. used in the form of their salts: ethylphosphoric acid, dibutylphosphoric acid, di(2-ethylhexyl)phosphoric acid, (butyl)(chloroethyl)phosphoric acid, diphenylphosphoric acid, butylphenylphosphoric acid, dichloroethylphosphoric acid and the like. For salt formation, they are preferably reacted with amines used for a long time in the chemistry of the polyisocyanates/polyurethanes, e.g. triethylenediamine, triethylamine, dimethylcyclohexylamine, pentamethyldipropylenetriamine; though other industrially valuable compounds, e.g. dimethylacetamide and N-methylpyrrolidone may also be employed for salt formation. The salts are preferably formed by reacting the phosphoric acid mono- or diester with an equivalent amount of the corresponding amine or the selected alkaline metal compound, respectively.

The mechanism, by which the phosphoric acid esters catalyze the polyisocyanate reaction, has not yet been explained. It has to be supposed that, due to their total or partial hydrolysis such compounds are formed, which exert an accelerating effect on the formation of polyureas, polybiurets and polyisocyanurates.

The phosphoric acid esters used according to the invention simultaneously function as diluting agents, too; they measurably decrease the viscosity of the isocyanate component. This effect on viscosity is achieved by using higher concentrations and results in a processing advantage.

For the preparation of the PPP polymers according to the invention, the starting substances commonly used in the polyurethane industry can be used. It is preferable to use the phosgene-treated derivatives of aniline/formaldehyde condensation products such as highly pure MDI (derivatives containing uretdione rings or carbodiimide groups, respectively), MDI adducts, MDI prepolymers, sulfonated MDI and the like. Among these, crude MDI and polymeric MDI are the most cost-saving. In addition to the isocyanates mentioned above, also included are a great number of other di- and polyisocyanates mentioned above, a great number of other di- and polyisocyanates form PPP resins of good quality in the presence of phosphoric acid ester catalysts used according to the invention. Examples of such di- and polyisocyanates are e.g.: toluylene diisocyanate (TDI) and di- or trimerized derivatives thereof; TDI-containing adducts and prepolymers; hexamethylene diisocyanate and derivatives thereof; isophorone diisocyanate and derivatives thereof; cycloaliphatic MDI (i.e. $H_{12}$MDI such as e.g. Desmodur $W^R$) and derivatives thereof; m-xylylene diisocyanate and derivatives thereof; as well as other di- and polyisocyanates listed in Houben-Weyl, Methoden der organischen Chemie, Vol. E20/2, pages 1588–1595. From these, the following ones are particularly useful:

1,6-diisocyanatohexane,
5-isocyanato-3-isocyanatomethyl-1,1,3-trimethylcylohexane,
1,3-bis(5-isocyanato-1,3,3-trimethylphenyl)-2,4-dioxo-1,3-diazetidine,
biuret triisocyanate,
bis(4-isocyanatocyclohexyl)methane,
1,3-bis(isocyanatomethyl)benzene,
1,3-bis(1-isocyanato-1-methylethyl)benzene,
2,4-diisocyanatotoluene,
2,6-diisocyanatotoluene,
2-ethyl-1,2,3-tris(3-isocyanato-4-methyl-anilinocarboalkoxy)propane,
N,N'-bis(3-isocyanato-4-methylphenyl)urea,
1,3-bis(3-isocyanato-4-methylphenyl)-2,4-dioxo-1,3-diazetidine,
1,3,5-tris(3-isocyanato-4-methylphenyl)-2,4,6-trioxo-hexahydro-1,3,5-triazine,
1,3-bis(3-isocyanato-4-methylphenyl)-2,4,5-trioxo-imidazolidine,
bis(2-isocyanatophenyl)methane,
(2-isocyanatophenyl)-(4-isocyanatophenyl)methane,
bis(4-isocyanatophenyl)methane (also partially transformed to urethane or partially transformed to carbodiimide),
2,4-bis(4-isocyanatobenzyl)-1-isocyanatobenzene, [4-isocyanato-3-(4-isocyanatobenzyl)phenyl]-[2-isocyanato-5-(4-isocyanatobenzyl)phenyl]methane,
bis-isocyanates with S-functions, e.g. with sulfan or sulfone groups,
1,3,5-tris[6-(1-methyl-propylidene-aminoxycarbonylamino)hexyl]-2,4,6-trioxo-hexahydro-1,3,5-triazine.

The mixtures of various proportions of the above-mentioned substances with crude MDI or MDI derivatives may also be used.

As polysilicic acid components commercially available lithium, sodium and potassium water-glasses of various moduli (silicon dioxide/sodium oxide ratio) and various viscosities are commonly used. When using the same isocyanate but various kinds of water-glass, the mechanical characteristics (e.g. the tensile strength) or the reaction rate will of course be varying; however, these differences can be minimized or even entirely eliminated by the suitable selection of the catalysts. It may also be convenient to use peculiar anhydrous water-glasses or water-glasses with a low water-content as it has been described in the German patent publication No. DE-OS 3,227,580 (BASF) or in the U.S. patent specifications Nos. 3,607,794; 3,625,722; 3,819,392; 3,959,274; 4,153,768 and 4,273,908 or to employ mixtures of the polysilicic acid components listed above.

Other reactive diluents can also be utilized, optionally in addition to the phosphoric acid esters which function as diluents, too. Suitably, the total (i.e. not partial) esters formed with inorganic or organic acids, acetals, carbonates, ester-ethers, ester carbonates, glycidyl esters, di- and polyglycidyl esters of mono- or polyvalent aliphatic or cycloaliphatic alcohols can be considered for this purpose. Examples of such substances are e.g. ethylene glycol diacetate, propylene glycol diacetate, diethylene glycol diacetate, PEG 200 diacetate, PEG 600 diacetate, ethylene glycol dimethacrylate, dipropylene glycol diacetate, neopentylglycol diacetate, ethylene glycol monomethyl ether acetate, ethylene glycol carbonate, propylene glycol carbonate, triacetin, i.e. glycerol triacetate, trimethylolpropane triacetate, ethylene glycol bis(glycidyl ether), neopentyl glycol bis(glycidyl ether), glycerol triglycidyl ether, bis glycidyl adipate, adipic acid bis(ethylene glycol monomethyl ether) ester. Naturally, one can use appropriate mixtures of two or more diluting agents listed above, too.

These reactive diluents are preferably added to the polyisocyanate component. After mixing with the polysilicic acid component, the diluents are totally or partially hydrolyzed due to the effect of sodium hydroxide being present in the water-glass; the released polyvalent alcohols react with the isocyanate groups and function as chain-lengthening or flexibilizing agents, the monovalent alcohols act as chain-terminating agents.

As mentioned above, tertiary amine catalysts commonly used in the polyurethane chemistry or other compounds containing a tertiary amino group may additionally be employed for the differentiated adjustment of gelation time. Such commonly used catalysts are e.g.: triethylenediamine (Dabco), triethylamine, dimethylbenzylamine, bis(dimethylaminoethyl)ether, tetramethylguanidine; furthermore, e.g. dimethylformamide, dimethylacetamide, dimethylaniline, tetramethylurea, N-methylpyrrolidone, N-vinylpyrrolidone, dimethylaminopropionitrile, hexamethylenetetramine and the like, and the salts of these compounds formed with inorganic or organic acids; or mixtures of two or more compounds mentioned above may also be employed.

These catalysts are preferably mixed with the isocyanate component when they are stable for a long period during storage together. Similarly, it is possible to use tertiary amine catalysts being compatible for and unrestrictedly capable of storage together with the polysilicic acid component, e.g. water-glass. Tertiary amines of such type can be considered to be e.g.: tetraethoxyammonium hydroxide, diethoxyethanolamine, tetraethoxyethylenediamine and diethoxymorpholine as well as the mixtures of two or more compounds listed above.

Optionally, tensides may also be used for improving the dispersibility. It is preferred to use sulfonated products or their sodium salts as tensides. Examples of advantageously usable tensides are e.g. the salts of sulfomethylated melamines (concrete plasticizers under the trade mark Melment®) as well as the salts of sulfonated fatty acids and nonionic tensides and tenside mixtures (Evemul U, Evemul UN, manufacturer: Egyesült Vegyimüvek, Budapest, Hungary).

The properties of products prepared from PPP resins can be varied between wide limits by adding various artificial resins with low or medium viscosity. A part of these artificial resins are compatible with the isocyanate component whereas other ones can only directly added to the resin mixture as a third component. Particularly suitable modifying additives are aliphatic and cycloaliphatic di- and polyepoxy compounds, significantly increasing the light-stability of the products. Similarly epoxy resins based on polyphenols can be used for improving the mechanical properties. Furthermore, polyesters, vinyl esters, aminoplasts, phenoplasts and furan resins having a low or medium molecular mass (with a viscosity of about 10000 mPa.s) are useful for improving the structure and properties of PPP resins. A part of the artificial resins mentioned here, particularly the less viscous aliphatic and cycloaliphatic epoxy resins, play also the role of the reactive diluent and have been mentioned above among the reactive diluents although these compounds can be considered to be also modifying resins since they are built in to the polymer.

The polysilicic acid/polyisocyanate systems according to the invention are useful also for the preparation of half-hard foam materials with various solidity and density. For preparing a foam of low density it is preferred to use hydrophilized isocyanates and optionally epoxy resins as these can better be homogenized. It is suitable e.g. to work with a partially sulfonated MDI or MDI/polyethylene oxide prepolymer, however, foam materials with excellent properties can be prepared from PPP resins also in the case when a non-hydrophilized crude MDI is used.

For preparing the foam materials, known foaming agents, e.g. freons, can be used, though there exists the possibility of compositions to obtain a foam with excellent quality by utilizing the foaming effect of carbon dioxide alone. This variant is particularly advantageous because of the more and more severe regulations of environmental protection.

For the preparation of a foam, foam-stabilizing agents known per se, e.g. water-soluble polyether siloxanes, are also used. Tensides such as sodium salts of castor oil sulfonates, salts of fatty acids formed with amines having a simultaneous emulsifying and foam-stabilizing effect are also useful for stabilization.

Various granular and/or fibrous fillers can be added in significant amounts to the PPP resins. A part of these fillers are reactive, i.e. they accelerate the crosslinking of the system and improve, respectively, the solidity; such fillers are e.g. bentonites treated and made hydrophobic, respectively, by cetylpyridinium bromide as well as alumina and certain polymeric gel powders (e.g. PAA-based flocculating agents). However, the major part of fillers are inactive, e.g. titanium dioxide, barium sulfate, bentonite, chopped glass fibres, chopped artificial fibres, quartz sand and the like.

The invention is illustrated by in detail the aid of the following Examples.

EXAMPLE 1

ADJUSTMENT OF THE GELATION TIME BY VARIOUS PHOSPHORIC ACID ESTERS

General work prescription:

The amounts given in Table 1 of MDI and phosphoric acid esters or their salts, respectively as well as the optionally used ester-type active diluents and, when being compatible with MDI, the optionally employed tertiary amine catalyst (in a total amount of 200 g in each case) are mixed together in a plastic beaker. The water-glass is placed in another plastic beaker and the tertiary amine catalyst is optionally added (similarly in a total amount of 200 g).

The contents of both beakers are carefully homogenized, then poured together and stirred with a rapid mixer (about 2800 revolutions/minute) for 30 seconds. The yellow dispersion is molded to test pieces of 20×20×120 mm and 40×40×160 mm in size, respectively in a metal template sprayed with a shape separating agent. It is observed, for how long the residue of the batch remains pourable, when it begins to gelate and when the material hardens and cannot be deformed any longer.

| Materials used: | |
|---|---|
| Water-glass | Modulus 2.4, $\eta$ = 1800 mPa · s, produced by Kemikal, Budapest, Hungary, |
| Polyisocyanate | crude MDI, $\eta$ = 400 mPa · s, isocyanate equivalent = 2.7, produced by Borsodi Vegyi Kombinát, Kazincbarcika, Hungary, |
| PE-19 | MDI-prepolyimer, Borsodi Vegyi Kombinát, Kazincbarcika, Hungary, |
| PA-22 | MDI-prepolymer, Borsodi Vegyi Kombinát, Kazincbarcika, Hungary, |
| Phosgard ® 1227 | Diphosphate, manufacturer: Monsanto, USA, |
| Fyol ® 99 | Oligomer phosphate, manufacturer: Stauffer, USA, |
| Triacetin | Glycerol triacetate, Interkémia, Budapest, Hungary, |
| AH-14 | Neopentylglycol diglycidyl ether, manufacturer: MÜKI (Research Institute of the Industry of Plastics), Budapest, Hungary. |

The composition and gelation time of the batches as well as the bending strength thereof measured after 2 weeks are summarized in Table 1.

Table 1 shows that the gelation time can be adjusted between wide limits by using various phosphoric acid esters or phosphoric acid ester salts, respectively. The table further shows that the test pieces prepared without phosphoric acid ester catalyst and used for comparison possess a lower solidity.

EXAMPLE 2

PREPARATION OF A FOAM

General work prescription:

As described in Example 1, the polysilicic acid component and polyisocyanate component are prepared in plastic beakers according to the amounts given in Table 2 (20 g each), then poured together and homogenized by a rapid mixer (4000 revolutions/minute) in a beaker of 50 mm diameter at the bottom for 30 seconds. The dispersion is allowed to foam up in the beaker. The foam is taken off from the beaker after 1 hour and its apparent density (g/cm$^3$) and compressive strength are measured.

| Materials used: | |
|---|---|
| Water-glass | Modulus 2.4, $\eta$ = 150 mPa · s, produced by Kemikal, Budapest, Hungary, |
| Polyisocyanate | 1) crude MDI, $\eta$ = 400 mPa · s, isocyanate equivalent = 2.7, produced by Borsodi Vegyi Kombinát, Kazincbarcika, Hungary, 2) prepared from the preceding one by sulfonation according to the method of the Hungarian patent specification No. 169,478 for the work prescription given for "Prepolymer P3"; NCO content 20%, SO$_3$ content 2.8%, viscosity = 1100 cP) |
| Catalyst | 1.5% Dabco TMR, |

| Materials used: | |
|---|---|
| Tenside | Tegostab B8407, manufacturer: Goldschmidt Co., Germany, |
| AH-14 | Neopentylglycol diglycidyl ether, manufacturer: MÜKI (Research Institute of the Industry of Plastics), Budapest, Hungary, |
| Wisitom | Wisitom VP 200/1 manufacturer: Willich GmbH, Germany. |

The composition of the batches, the compressive strength and apparent density of the foams obtained are summarized in Table 2. It can be seen from this Table that the first three products prepared without any phosphoric acid ester leave much to be desired concerning the compressive strength, whereas the foams prepared according to the invention show a very good compressive strength partly at very low apparent densities.

EXAMPLE 3

PPP RESIN PREPARED WITH FILLERS

General work prescription:

As described in Example 1, a pourable resin is prepared from polyisocyanate, water-glass and 20% by mass of tri(2-ethylhexyl) phosphate of 25% by mass of trichloroethyl phosphate, respectively calculated for the polyisocyanate. The test pieces containing sand or glass net as filler are poured in metal forms of 40×40×160 mm in size. The test pieces, containing a glass wicker (quilt) as strengtheining means, are manually laminated. Test pieces of 10×20×120 mm in size are cut out from the sheets of 1×1×0.01 m in dimension. The tubes containing glass rowings as filler are prepared by the usual fibre rolling techniques; test pieces of 5×20×120 mm in size are cut out.

| Materials used: | |
|---|---|
| Water-glass | Modulus 2.4 $\eta$ = 1800 mPa · s, produced by Kemikal, Budapest, Hungary, |
| Polyisocyanate | crude MDI, $\eta$ = 400 mPa · s, isocyanate equivalent = 2.7, produced by Borsodi Vegyi Kombinát, Kazincbarcika, Hungary, |
| Glass net | Type 41-044, manufacturer: Tolnatex; Szekszárd, Hungary; spinned glass net of a surface mass of 340 g/m$^2$, |
| Glass wicker (quilt) | Surface mass 450 g/m$^2$, |
| Sand | Quartz sand with 1 to 6 mm particle size. |

The results are summarized in Table 3. It can be seen from the Table that the systems according to the invention can very highly be filled. A resin filled even with more than 100% of sand also shows solidity values, which are not significantly inferior to those of the pure resin. The binders and laminates prepared with the usual strengthening insets show very good properties.

EXAMPLE 4

INVESTIGATION OF THE RESISTANCE AGAINST CHEMICALS

The pieces of 20×20×120 mm in size each are molded from the resins described in Example 3 (prescription A and prescription B) without fillers. After keeping the test pieces in various reactive fluids for 1 month, their bending strength is determined. The results of these experiments, together with the comparative values of the reference samples stored in air or in distilled water, respectively, are summarized in Table 4.

The Table shows that the resistance against chemicals of the PPP resins according to the invention is excellent. In comparison to the values measured after storage in air or distilled water, respectively, the resistance is not altered, with consideration of the limits of error, during storage in concentrated sodium hydroxide, dilute acids, alcohols, chlorinated or aromatic hydrocarbons. After storage in dilute acetic acid or cyclohexanone, the solidity is significantly increased. The solidity is decreased by about 10 to 20% in concentrated mineral acids. The material not only swells but is later disaggregated in strongly polar dimethylformamide.

The resistance of the PPP artificial resins against acetic acid, cyclohexanone, benzene and chlorinated hydrocarbons is substantially better than that of the polyester and vinyl ester artificial resins.

TABLE 1

Gelation time and solidity of PPP resins prepared according to Example 1

| Phosphoric acid ester | | | Other additives | | Bending strength | Gelation |
|---|---|---|---|---|---|---|
| Substance | Amount % | MDI % | Substance | Amount % | N/mm² | time, min |
| Triethyl phosphate | 10 | 90 | — | | 20 | 8 |
| Tributyl phosphate | 20 | 80 | — | | 25 | 10 |
| Tricresyl phosphate | 30 | 70 | — | | 22* | 300 |
| Trichloroethyl phosphate | 30 | 70 | — | | 35 | 15 |
| Tricresyl phosphate and | 30 | | | | | |
| Tributyl phosphate | 10 | 60 | — | | 25 | 80 |
| Tricresyl phosphate and | 20 | | | | | |
| Trichloroethyl phosphate | 10 | 70 | — | | 26 | 30 |
| Phosgard ® 1227 | 30 | 70 | — | | 24 | 100 |
| Fyrol ® | 30 | 70 | — | | 18 | 60 |
| Triethyl phosphate | 10 | 70 | Triacetin | 10 | 21 | 15 |
| Trichloroethyl phosphate | 20 | 70 | AH-14 | 10 | 30 | 20 |
| Trichloroethyl phosphate | 20 | 70 | Neopentylglycol diacetate | 10 | 28 | 25 |
| Trichloroethyl phosphate | 10 | 70 | Neopentylglycol diacetate | 20 | 23 | 40 |
| Triethyl phosphate | 1 | 97 | Dimethylacetamide | 2 | 20 | 25 |
| Trichloroethyl phosphate | 30 | 68 | Dimethlacetamide | 2 | 40 | 3 |
| Trichloroethyl phosphate | 30 | 68 | N-Methylpyrrolidone | 2 | 38 | 6 |
| Trichloroethyl phosphate | 30 | 50 | PE-19 | 20 | 34 | 14 |
| Trichloroethyl phosphate | 30 | 20 | PE-19 | 50 | 38 | 3 |
| Trichloroethyl phosphate | 30 | 20 | PA-22 | 50 | 41 | 10 |
| Hexamethylenetetramine salt of di(2-ethylhexyl)-phosphoric acid | 5 | 95 | | | 19 | 15 |
| Triethylenediamine salt of diethylphosphoric acid + tributyl phosphate | 20 | 75 | | | 35 | 8 |
| — | — | 98 | Dimethylacetamid | 2 | 4 | 45 |
| | | | WILKIT | | 10 | 5 |

*Heat-treated at 80° C. for 1 hour

TABLE 2

Compressive strength and apparent density of foams with various formulations

| Example | Additive | | MDI | | Compressive strength of | Apparent density |
|---|---|---|---|---|---|---|
| | Substance | Amount % | Species | Amount % | foam N/mm² | g/cm³ |
| 1 Without additives | | | rough | 100 | 0,08 | 110 |
| 2 With active dluent | AH-14 | 30 | rough | 70 | 0,13 | 78 |
| 3 Wisitom (trade product) | | | ? | 100 | 0,02 | 30 |
| According to the invention | Triethyl phosphate | 10 | rough | 90 | 0,13 | 81 |
| | Triethyl phosphate | 20 | rough | 80 | 0,15 | 71 |
| | Triethyl phosphate | 20 | sulfonated | 80 | 0,18 | 39 |
| | Trichloroethyl phosphate | 30 | rough | 70 | 0,23 | 72 |
| | Trichloroethyl phosphate | 30 | sulfoanted | 70 | 0,21 | 33 |

TABLE 3

PPP resins prepared with fillers

| Prescription | PPP resin (%) in the binding material | Filler (%) | Filler | Bending strength N/mm² | Tensile strength N/mm² |
|---|---|---|---|---|---|
| A | 100 | — | — | 35 | 30 |
| A | 90 | 10 | Glass net | 80 | 55 |
| A | 60 | 40 | Glass quilt | 108 | 92 |
| A | 32 | 68 | Glass rowings | 150* | 120* |
| A | 40 | 60 | Sand | 20 | 15 |
| B | 40 | 60 | Sand | 30 | 20 |
| B | 90 | 10 | Glass net | 95 | 70 |
| B | 60 | 40 | Glass quilt | 120 | 105 |

Prescription A: 20 parts of tri(2-ethylhexyl) phosphate calculated for 100 parts of isocyanate
Prescription B: 25 parts of trichloroethyl phosphate calculated for 100 parts of isocyanate
*Measured on the test pieces cut out from the rolled tube

TABLE 4

Resistance against chemicals

| | Prescription B | | Prescription A | |
|---|---|---|---|---|
| Chemicals | Bending strength N/mm² | Note | Bending strength N/mm² | Note |
| Air | 28 | unchanged | 23 | unchanged |
| Distilled water | 33 | unchanged | 29 | unchanged |
| Concd. hydrochloric acid | 23 | dark yellow | 24 | yellowish brown |
| 10% hydrochloric acid | 31 | yellowish | 30 | dark yellow |
| Concd. acetic acid | 32 | unchanged | 32 | unchanged |
| 10% acetic acid | 38 | unchanged | 34 | unchanged |
| 40% sodium hydroxide | 27 | unchanged | 29 | unchanged |
| Ethanol | 32 | unchanged | 29 | unchanged |
| Acetone | 11 | swollen | 10 | swollen |
| Benzene | 35 | unchanged | 32 | unchanged |
| Cyclohexane | 36 | unchanged | 35 | unchanged |
| Dimethylformamide | — | disaggregated | — | disaggregated |
| Carbon tetrachloride | 36 | unchanged | 30 | unchanged |

We claim:

1. A polysilicic acid/polyisocyanate composition having a controlled gelation time and the mechanical characteristics of a polyester, which consists essentially of:

100 parts by mass of a polyisocyanate;

80 to 200 parts by mass of a polysilicic acid component;

3 to 50 parts by mass of phosphoric acid triesters and/or salts of phosphoric acid mono- and/or diesters formed with amines and/or alkaline metals;

0 to 1 part by mass of a catalyst selected from the group consisting of triethylenediamine, triethylamine, dimethylbenzyl amine, bis(dimethylaminoethyl) ether, tetramethylguanidine, dimethylformamide, dimethylacetamide, dimethylaniline, tetramethylurea, N-methylpyrrolidone, N-vinylpyrrolidone, dimethylaminopropionitrile, and hexamethylenetriamine, or a salt thereof formed with an organic or inorganic acid or a catalyst selected from the group consisting of tetramethoxy ammonium hydroxide, diethoxyethanolamine, tetramethoxyethylenediamine, diethoxymorpholine, and mixtures thereof;

5 to 50 parts by mass of a reactive diluent which after mixing with the polysilicic acid, hydrolyses due to the effect of sodium hydroxide present in the polysilicic acid, to release polyvalent alcohols capable of reacting with the polyisocyanate to function as chain lengthening or flexibilizing agents, or to release monovalent alcohols capable of reacting with the polyisocyanate to function as chain terminating agents, 0 to 5 parts by mass of a tenside as well as 0 to 400% by mass of fillers and optionally other auxiliaries, calculated for the total mass of the components listed above.

2. The polysilicic acid/polyisocyanate composition according to claim 1, characterized in that the phosphoric acid esters are esters of aliphatic or cycloaliphatic alcohols or of phenols, or are diphosphates, oligomeric phosphates or aliphatic esters of polyols containing phosphoric acid ester bonds with the following structures:

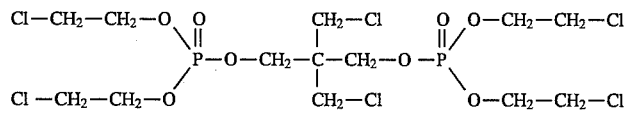

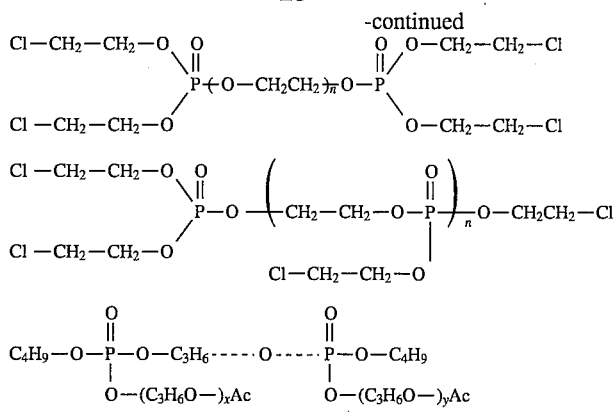

| | |
|---|---|
| | n = 1-3 |
| | n = 2-4 |
| | x ≧ 3<br>y ≧ 3 | wherein AC means CH₃CO— or an other aliphatic acyl group or mixtures of at least two compounds listed above.

3. The polysilicic acid/polyisocyanate compositions according to claim 1, characterized in that the reactive diluent is an ester formed with an inorganic or organic acid, acetal, carbonate, ester-ether, ester carbonate, or mono, di- or polyglycidyl ether of a mono- or polyvalent aliphatic or cycloaliphatic alcohol or mixtures of at least two reactive diluents listed above.

4. The polysilicic acid/polyisocyanate compositions according to claim 1, characterized in that the catalyst is triethylenediamine, triethylamine, dimethylbenzylamine, bis(dimethylaminoethyl) ether, tetramethylguanidine, dimethylformamide, dimethylacetamide, dimethylaniline, tetramethylurea, N-methylpyrrolidone, N-vinylpyrrolidone, dimethylaminopropionitrile, hexamethylenetetramine or a salt thereof formed with an inorganic or organic acid or a mixture of at least two of these compounds.

5. The polysilicic acid/polyisocyanate compositions according to claim 1, characterized in that the catalyst is tetraethoxyammonium hydroxide, diethoxyethanolamine, tetraethoxyethylenediamine, diethoxymorpholine or a mixture of at least two catalysts named above.

6. The polysilicic acid/polyisocyanate composition according to claim 1 which further comprises at least one auxiliary tenside, artificial resin, foaming agent or foam-stabilizing agent.

7. A process for the preparation of a polysilicic acid/polyisocyanate composition having a controlled gelation time and the mechanical characteristics of a polyester, which consists essentially of:

100 parts by mass of a polyisocyanate;

80 to 200 parts by mass of a polysilicic acid component;

3 to 50 parts by mass of phosphoric acid triesters and/or salts of phosphoric acid mono- and/or diesters formed with amines and/or alkaline metals;

0 to 1 part by mass of a catalyst selected from the group consisting of triethylenediamine, triethylamine, dimethylbenzylamine, bis(dimethylaminoethyl) ether, tetramethylguanidine, dimethylformamide, dimethylacetamide, dimethylaniline, tetramethylurea, N-methylpyrrolidone, N-vinylpyrrolidone, dimethylaminopropionitrile, and hexamethylenetriamine, or a salt thereof formed with an organic or inorganic acid or a catalyst selected from the group consisting of tetramethoxy ammonium hydroxide, diethoxyethanolamine, tetramethoxyethylenediamine, diethoxymorpholine, and mixtures thereof;

5 to 50 parts by mass of a reactive diluent which after mixing with the polysilicic acid, hydrolyses due to the effect of sodium hydroxide present in the polysilicic acid, to release polyvalent alcohols capable of reacting with the polyisocyanate to function as chain lengthening or flexibilizing agents, or to release monovalent alcohols capable of reacting with the polyisocyanate to function as chain terminating agents, 0 to 5 parts by mass of a tenside are homogenized together and optionally 50 to 100% by mass of fillers and optionally other auxiliaries, calculated for the total mass of the components listed above, incorporated thereto.

8. A process for the preparation of a polysilicic acid/polyisocyanate composition according to claim 7, characterized in that the phosphoric acid esters are esters of aliphatic or cycloaliphatic alcohols or of phenols, furthermore diphosphates, oligomeric phosphates or aliphatic esters of polyols containing phosphoric acid ester bonds with the following structures:

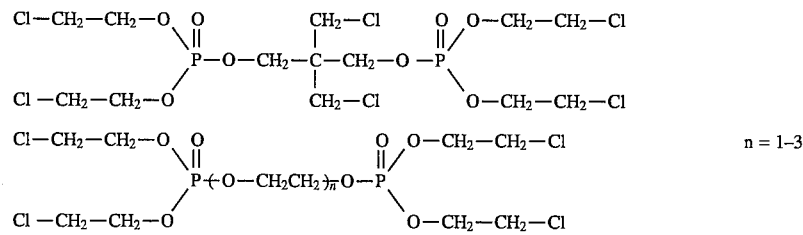

n = 1-3

-continued

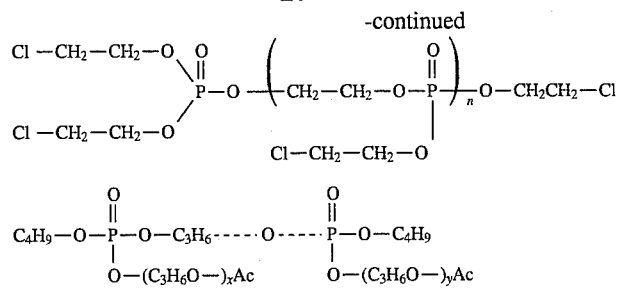

$$C_4H_9-O-\underset{\underset{O-(C_3H_6O-)_xAc}{|}}{\overset{\overset{O}{\|}}{P}}-O-C_3H_6----O----\underset{\underset{O-(C_3H_6O-)_yAc}{|}}{\overset{\overset{O}{\|}}{P}}-O-C_4H_9$$

$n = 2-4$ $x \geq 3$
$y \geq 3$ wherein AC means $CH_3CO$— or an other aliphatic acyl group or mixtures of at least two of these compounds are used as phosphoric acid esters.

9. A process according to claim 7, characterized in that the esters formed with inorganic or organic acids, acetals, carbonates, ester-ethers, ester carbonates, or mono, di- or polyglycidyl ethers of mono- or polyvalent aliphatic or cycloaliphatic alcohols or mixtures of at least two of the above diluting agents are used as reactive diluents.

10. A process according to claim 7, characterized in that triethylenediamine, triethylamine, dimethylbenzylamine, bis(dimethylaminoethly) ether, tetramethylguanidine, dimethylformamide, dimethylacetamide, dimethylaniline, tetramethylurea N-methylpyrrolidone, N-vinylpyrrolidone, dimethylaminopropionitrile, hexamethylenetetramine or the salts thereof formed with inorganic or organic acids or mixtures of at least two of these compounds are used as the catalysts.

11. A process according to claim 7, characterized in that tetraethoxyammonium hydroxide, diethoxyethanolamine, tetraethoxyethylenediamine, diethoxymorpholine or mixtures of at least two catalysts named above, are used as catalysts.

12. A process according to claim 11, characterized in that tensides and/or artificial resins and/or foaming agents and/or foam-stabilizers are used as auxiliaries.

13. The polysilicic acid/polyisocyanate composition defined in claim 1 wherein the reactive diluent is ethylene glycol diacetate, propylene glycol diacetate, diethylene glycol diacetate, PEG 200 diacetate, PEG 600 diacetate, ethylene glycol dimethacrylate, dipropylene glycol diacetate, neopentylglycol diacetate, ethylene glycol monomethyl ether acetate, ethylene glycol carbonate, propylene glycol carbonate, glycerol triacetate, trimethylolpropane triacetate, ethylene glycol bid(glycidyl ether), neopentyl glycol bis(glycidyl ether), glycerol triglycidyl ether, bis glycidyl adipate, adipic acid bis(ethylene glycol monomethyl ether) ester or a mixture of at least two of the above.

14. The process for the preparation of a polysilicic acid/polyisocyanate composition defined in claim 7 wherein the reactive diluent is ethylene glycol diacetate, propylene glycol diacetate, diethylene glycol diacetate, PEG 200 diacetate, PEG 600 diacetate, ethylene glycol dimethacrylate, dipropylene glycol diacetate, neopentylglycol diacetate, ethylene glycol monomethyl ether acetate, ethylene glycol carbonate, propylene glycol carbonate, glycerol triacetate, trimethylolpropane triacetate, ethylene glycol bid(glycidyl ether), neopentyl glycol bis(glycidyl ether), glycerol triglycidyl ether, bis glycidyl adipate, adipic acid bis(ethylene glycol monomethyl ether) ester or a mixture of at least two of the above.

* * * * *